United States Patent [19]
Wirkus

[11] Patent Number: 4,635,392
[45] Date of Patent: Jan. 13, 1987

[54] FLOAT DEVICE

[76] Inventor: Clarence L. Wirkus, 13435 N.W. Jay St., Andover, Minn. 55304

[21] Appl. No.: 745,142

[22] Filed: Jun. 17, 1985

[51] Int. Cl.$^4$ ............................................. A01K 93/00
[52] U.S. Cl. ..................................................... 43/44.9
[58] Field of Search ............................. 43/44.9, 44.91

[56] References Cited
U.S. PATENT DOCUMENTS
2,315,048  3/1943  Croft ..................................... 43/44.9
4,418,492  12/1983  Rayburn ............................... 43/44.9

FOREIGN PATENT DOCUMENTS
17494 of 1891 United Kingdom ................. 43/44.9

Primary Examiner—Gene P. Crosby
Attorney, Agent, or Firm—Henry C. Kovar

[57] ABSTRACT

A float device, which is specifically useful as a fishing bobber, has a buoyant body, an elongate C-shaped guide sleeve inside of the body with an upper end and a bottom end extending outward beyond the body, and C-shaped key inside of the sleeve. A handle on one end of the key is provided for turning the key with respect to the sleeve, and the key has a rigid outer diameter frictionally fitted inside of a relatively elastic inner diameter of the sleeve.

3 Claims, 6 Drawing Figures

U.S. Patent   Jan. 13, 1987   4,635,392

FLOAT DEVICE

BACKGROUND OF THE INVENTION

1. Field of the Invention

This invention pertains to a float device having an improved structure for securement to a line.

2. The Prior Art

Float devices and structures and schemes for securement of the floats to lines date back into antiquity. The usefulness of float device has been known and utilized by mankind for most of the known history of man. These are extremely useful devices for supporting fishing nets, work tools used in water, fishing lines, and industrial devices such as float controls.

Fishing bobbers have had a great amount of effort expended in the search for better, easier and lower cost fasteners. Still, most bobber retainers corrode, break, slip when intended to be fixed, come apart, pinch the line, will not work on very small or very large lines, and suffer other technical disadvantages. The bobber market also gets stale and bored, and bobber users are perpetually looking for something new and improved.

OBJECTS OF THE INVENTION

It is an object of the present invention to provide a new and improved float device that may be used as a fishing bobber.

It is an object of the present invention to provide a float device having a new and improved structure for fastening of the float to a line.

It is an object of the present invention to provide a float device that does not corrode, does not pinch the line, is easy to use, does not break, and is economical and attractive to its users.

These and other objects of the invention will become manifest to those versed in the art upon making review of the teachings herein.

DESCRIPTION OF THE PREFERRED EMBODIMENT

Figure 1:
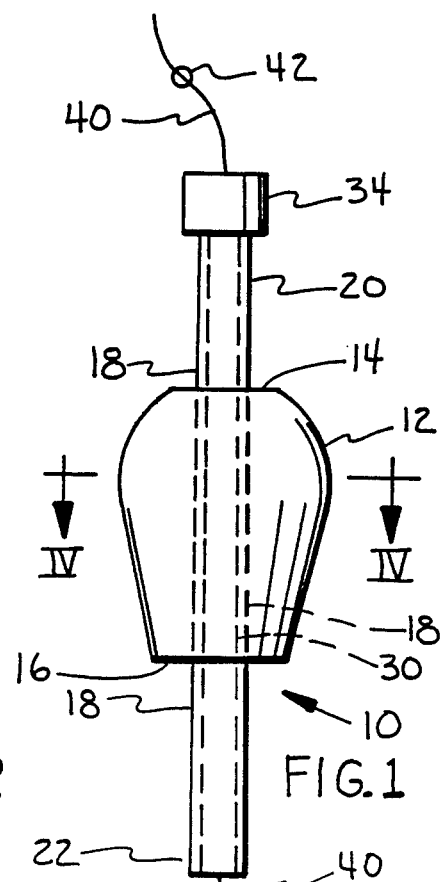
FIG. 1 is an elevational side view of the preferred embodiment of a float device according to the present invention.

According to the principles of the present invention, a float device such as shown in FIG. 1 and generally referred to by the numeral 10, is provided for use as a fishing bobber or float for a line of some purpose. The device 10 will hereinafter be referred to as the float 10.

The float 10 has a relatively large central buoyant body 12 with a top surface 14 and a bottom surface 16. An elongate guide sleeve 18 extends through the body 12 and has an upper end 20 extending outward beyond the body top surface 14, and a bottom end 22 extending downward beyond the body bottom surface 16. The sleeve 18 has an elongate slot 24 which extends the entire length of the sleeve 18, and the sleeve 18 has a C-shape as seen in section with the inside of the sleeve 18 being round. The sleeve 18 is contiguous and extruded of a transparent material, preferably an acrylic or styrene material. The sleeve upper end 20 is a short end and the sleeve bottom end 22 is a long end.

An elongate locking key 30 is inside of the sleeve 18. The key 30 is the same length as the sleeve 18 and extends along the entire length of the sleeve 18. The key 30 has a central elongate line slot 32 along its entire length. The opposite sides of the key slot 32 are parallel to each other and the slot 32 is of constant width. The back of the slot 32 is at the axis centerline of the diameter of the key 30. The diameter of the key 30 is a frictional fit in the sleeve 18. The key 30 has a filled cross-section in that it is not hollow like the sleeve 18 but is of a rigid and fixed diameter whereas the sleeve 18 is relatively elastic and can be diametrically expanded open by the key 30.

A first end of the key 30 has a handle 34 that has an outer diameter greater than the outer diameter of the sleeve 18 but less than the diameter of the body 12. The handle 34 is abutted against the upper or short sleeve end 20 and the combined height of the handle 34 and the upper sleeve end 20 approximates the length of the bottom or longer sleeve end 22. The second end of the key 32 is devoid of any retainer and the key 30 is held in the sleeve 18 by the friction between the rigid body of the key 30 and the elastic diameter of the sleeve 18. The key 30 is an opaque and very bright material and it has a specific gravity preferably in the range of 1.00 plus or minus 0.05 so that it does not disturb the buoyancy of the body 12. The slot 32 extends continuouly through the handle 34. The key 30 is removable from the sleeve 18, and the key 30 is of neutral buoyancy so it will not rapidly sink if dropped in the water.

Figure 5:
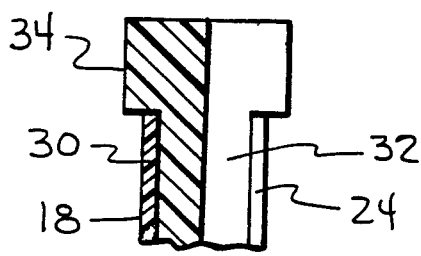
FIG. 5 is a detail sectional view of the key handle of FIG. 1.

The sleeve slot 24 is lined up with a body slot 26 and these slots 24, 26 provide an elongate passageway into the inside of the sleeve 18 and into the key slot 32. The details of the handle 34 in an open position are best shown in FIG. 5 and in a closed position in FIG. 6.

The float 10 is specifically intended to be used as a fishing bobber. It may also be used as a float on a net, or for float of wires, ropes, cables and the like.

Figure 2:
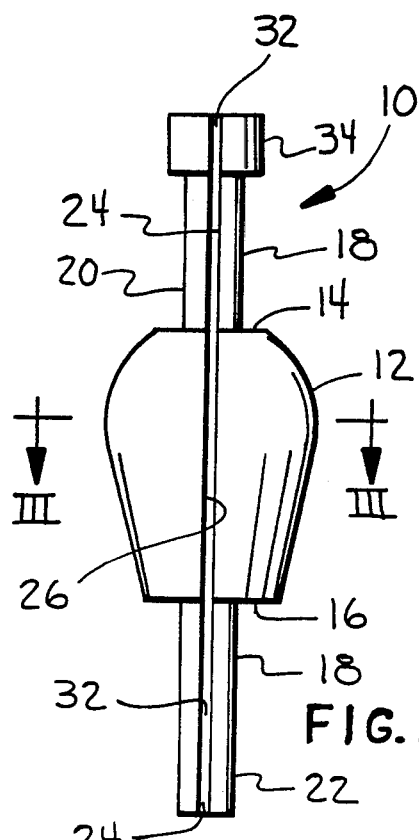
FIG. 2 is an elevational side view of the structure of FIG. 1 showing the line receiving structure open.
Figure 3:
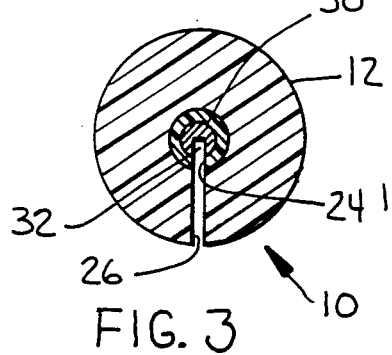
FIG. 3 is a horizontal downward looking sectional view taken through lines III—III of FIG. 2.
Figure 4:
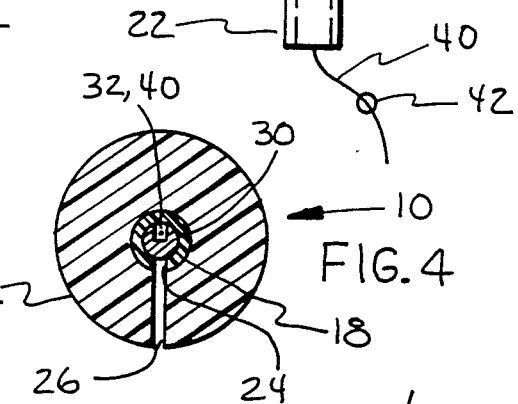
FIG. 4 is a horizontal downward looking sectional view taken through lines IV—IV of FIG. 1.
Figure 6:
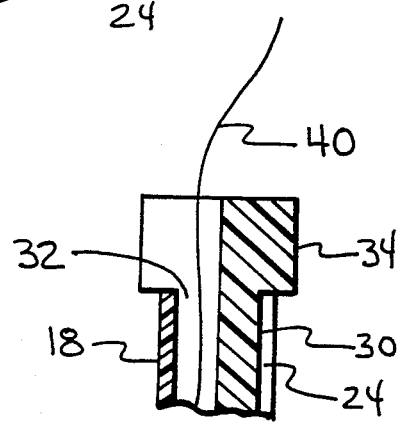
FIG. 6 is a sectional view of the structure of FIG. 5 in an alternate closed position.

FIG. 1 shows the float 10 secured upon a line 40 having a pair of beads 42 to restrain the float 10 along the line 40. To get the line 40 in or out of the float 10, the key 30 is grasped by the handle 34 and turned until the key slot 32 lines up with the body slot 26 and sleeve slot 24. The line 40 can then be slipped into or out of the key slot 32. The aligned position is shown in FIGS. 2 and 3. After the line 40 is placed in the keyslot 32, the handle 34 is grasped and the key 30 is turned to the position shown in FIG. 4 wherein the line 40 is locked as is shown in FIGS. 1 and 6.

Although other advantages may be found and realized and various and minor modifications may be suggested by those versed in the art, be it understood that I wish to embody within the scope of the patent warranted hereon, all such improvements as reasonably and properly come within the scope of my contribution to the art.

I claim as my invention:

1. A float device which may be readily and adjustably secured to a line said float device comprising:
    (a) a buoyant body having a top surface and a bottom surface;

(b) an elongate one piece contiguous guide sleeve positioned centrally and fixed with in and projecting out both ends of the body, said sleeve having an upper end extending outward beyond the body top surface and a bottom end extending outward beyond the body bottom surface, said sleeve having an elongate slot and being C-shaped in section along its entire length;

(c) an elongate one piece contiguous locking key inside of the sleeve, said key being the same general length as the sleeve and having an elongate slot and being C-shaped in section along its entire length, said key being retained in said sleeve by a tight frictional fit inside of and to the sleeve;

(d) a round key handle on a first end of the key, said handle being of larger diameter than the sleeve and of substantially smaller diameter then the buoyant body, said handle being beyond one end of the sleeve and being abutted against an outer end of said sleeve; and (e) in which both said key and said handle are a solid C-shape in cross-section, the opposed sides of the elongate slot in the key and handle being parallel to each other.

2. A float device for co-axial adjustable securement to a line without crimping of the line, comprising;

(a) a buoyant body having top surface and a lower surface, said body having an elongate axial slot into a center bore;

(b) an elongate one piece contiguous C-shaped extruded tubular sleeve secured and fixed in and projecting out both ends of the bore of the body with the slot of the tube being aligned with the slot of the body and extending the complete length of the tube;

(c) an elongate contiguous locking key having a C-shaped cross-section inside of the sleeve, said key having an integral handle of a larger C-shaped cross-section than the sleeve, said handle being spaced from and being of lesser diameter than the body, said key having a relatively rigid outer diameter frictionally fitting inside of a relatively elastic inner diameter of said sleeve; and (d) in which said key with its handle is frictionally retained within the sleeve, is frictionally removable and re-insertable into the sleeve, is of generally neutral buoyancy and is of a brilliant color.

3. An improved fishing bobber which may be readily and adjustably secured to a line, said bobber comprising;

(a) a buoyant body having a top surface and an opposed and spaced apart bottom surface;

(b) a transparent elongate guide sleeve positioned and fixed centrally within the body, said sleeve having an upper end extending outward beyond the body top surface and a bottom end extending outward beyond the body bottom surface, said sleeve having a full length elongate slot and being C-shaped in section along its entire length;

(c) an opaque one piece contiguous brilliantly colored locking key inside of the sleeve, said key being at least of the same general length as the sleeve and having a full length elongate slot and being C-shaped in section along its entire length, said key being retained in said sleeve by a tight frictional fit inside of and to the sleeve;

(d) a key handle on a first end of the key, said handle being of larger diameter than the sleeve and of substantially smaller diameter then the buoyant body and being beyond and spaced from said top surface of the buoyant body;

(e) said key and handle having a specific gravity of 1.00 plus or minus 0.05;

(f) the upper end of said guide sleeve being shorter then the bottom end, said handle being abutted against the distal extremity of the upper end;

(g) said key and said handle being of a solid and relatively rigid C-shape in cross-section, with opposed sides of the key elongate slot being parallel to each other throughout the depth of the slot, both the key and handle slot being of the same constant width; and (h) in which the sleeve has an elastic inner diameter normally sized smaller than the key diameter, said sleeve being resiliently frictionally fitted upon the key.

* * * * *